United States Patent
Brown

(10) Patent No.: US 10,759,346 B1
(45) Date of Patent: Sep. 1, 2020

(54) SIDE-VIEW MIRROR CLEANER

(71) Applicant: Neil Brown, Windsor (CA)

(72) Inventor: Neil Brown, Windsor (CA)

(*) Notice: Subject to any disclaimer, the term of this patent is extended or adjusted under 35 U.S.C. 154(b) by 0 days.

(21) Appl. No.: 16/242,080

(22) Filed: Jan. 8, 2019

(51) Int. Cl.
*A46B 11/02* (2006.01)
*B60R 1/06* (2006.01)
*A46B 11/00* (2006.01)

(52) U.S. Cl.
CPC .......... *B60R 1/0602* (2013.01); *A46B 11/002* (2013.01); *A46B 11/0062* (2013.01); *A46B 2200/3046* (2013.01)

(58) Field of Classification Search
CPC .......... A46B 2200/3046; A46B 11/002; A46B 11/0062; B60R 1/0602
USPC ...................................................... 401/188 R
See application file for complete search history.

(56) References Cited

U.S. PATENT DOCUMENTS

| | | | |
|---|---|---|---|
| 4,240,176 A | 12/1980 | Farmer | |
| D318,158 S | 7/1991 | Ediger | |
| 5,864,913 A | 2/1999 | Robertson | |
| D407,876 S | 4/1999 | Ward | |
| 5,908,255 A * | 6/1999 | Branch | A46B 11/002 401/137 |
| 5,987,685 A | 11/1999 | Lambert | |
| 6,141,814 A | 11/2000 | Renken | |
| 6,546,590 B2 | 4/2003 | Waters | |
| 6,692,171 B2 | 2/2004 | Vito | |
| 7,470,078 B2 | 12/2008 | Banco | |
| 7,976,235 B2 * | 7/2011 | Hoadley | A46B 5/0075 401/138 |
| 8,763,616 B2 * | 7/2014 | Koptis | A46B 11/001 134/184 |
| 9,403,261 B2 * | 8/2016 | Weinberger | A47J 43/288 |
| 10,251,471 B1 * | 4/2019 | Sanderson | A46B 11/0017 |

FOREIGN PATENT DOCUMENTS

WO        2011085770        7/2011

* cited by examiner

*Primary Examiner* — Jennifer C Chiang
(74) *Attorney, Agent, or Firm* — Kyle A. Fletcher, Esq.

(57) ABSTRACT

The side-view mirror cleaner is a cleaning tool. The side-view mirror cleaner is configured for use with a vehicle. The vehicle is further defined with a rear-view mirror mounted on the exterior of the vehicle. The side-view mirror cleaner cleans the rear-view mirror. The side-view mirror cleaner comprises a cleaning head, a latching blade, a handle, a dispenser, and a cap. The cleaning head contains the working portion of the side-view mirror cleaner that cleans the rear-view mirror. The cleaning head is interchangeable. The latching blade attaches the handle to the cleaning head. The handle is an extension structure. The dispenser is a device that applies a cleaning fluid to the rear-view mirror. The dispenser attaches to the handle. The cap is a closure that encloses the dispenser. The cap attaches to the dispenser.

18 Claims, 7 Drawing Sheets

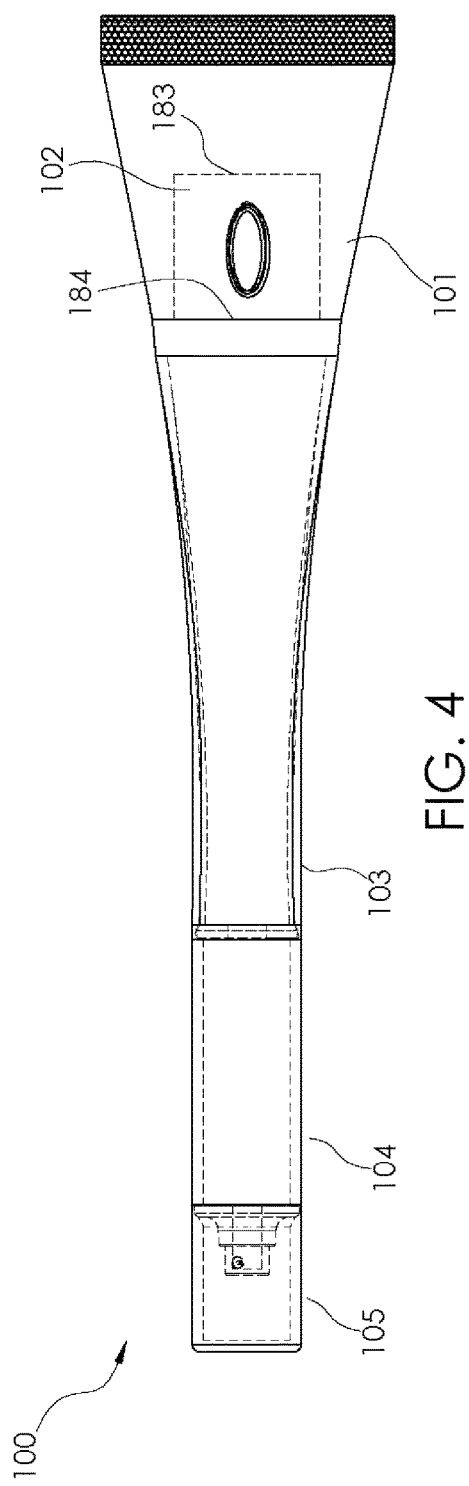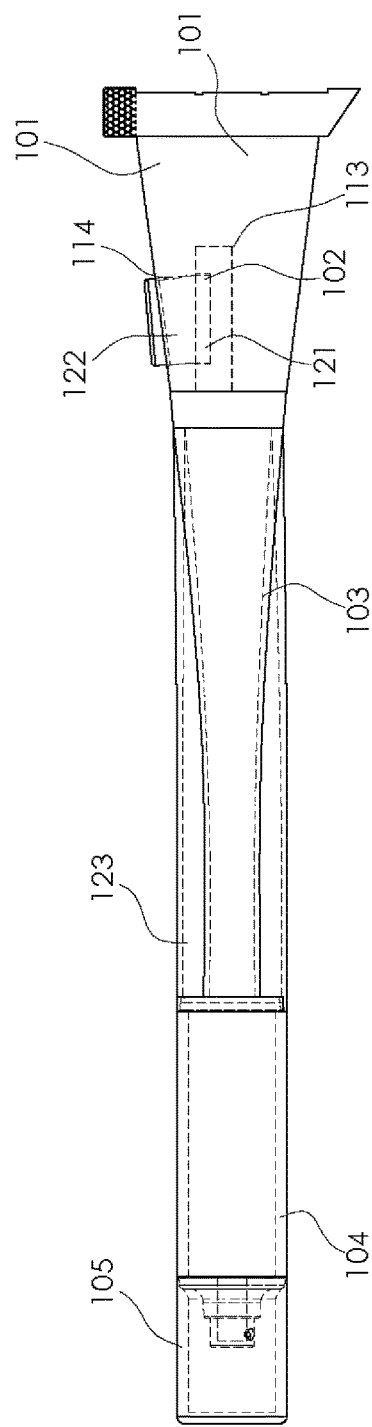
FIG. 4
FIG. 5

US 10,759,346 B1

SIDE-VIEW MIRROR CLEANER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of transportation and vehicles, more specifically, a method for cleaning an optical viewing arrangement of a rear-view mirror mounted on the exterior of a vehicle.

SUMMARY OF INVENTION

The side-view mirror cleaner is a cleaning tool. The side-view mirror cleaner is configured for use with a vehicle. The vehicle is further defined with a rear-view mirror mounted on the exterior of the vehicle. The side-view mirror cleaner cleans the rear-view mirror. The side-view mirror cleaner comprises a cleaning head, a latching blade, a handle, a dispenser, and a cap. The cleaning head contains the working portion of the side-view mirror cleaner that cleans the rear-view mirror. The cleaning head is interchangeable. The latching blade attaches the handle to the cleaning head. The handle is an extension structure. The dispenser is a device that applies a cleaning fluid to the rear-view mirror. The dispenser attaches to the handle. The cap is a closure that encloses the dispenser. The cap attaches to the dispenser.

These together with additional objects, features and advantages of the side-view mirror cleaner will be readily apparent to those of ordinary skill in the art upon reading the following detailed description of the presently preferred, but nonetheless illustrative, embodiments when taken in conjunction with the accompanying drawings.

In this respect, before explaining the current embodiments of the side-view mirror cleaner in detail, it is to be understood that the side-view mirror cleaner is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the side-view mirror cleaner.

It is therefore important that the claims be regarded as including such equivalent construction insofar as they do not depart from the spirit and scope of the side-view mirror cleaner. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 4 is a top view of an embodiment of the disclosure.

FIG. 5 is a side view of an embodiment of the disclosure.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
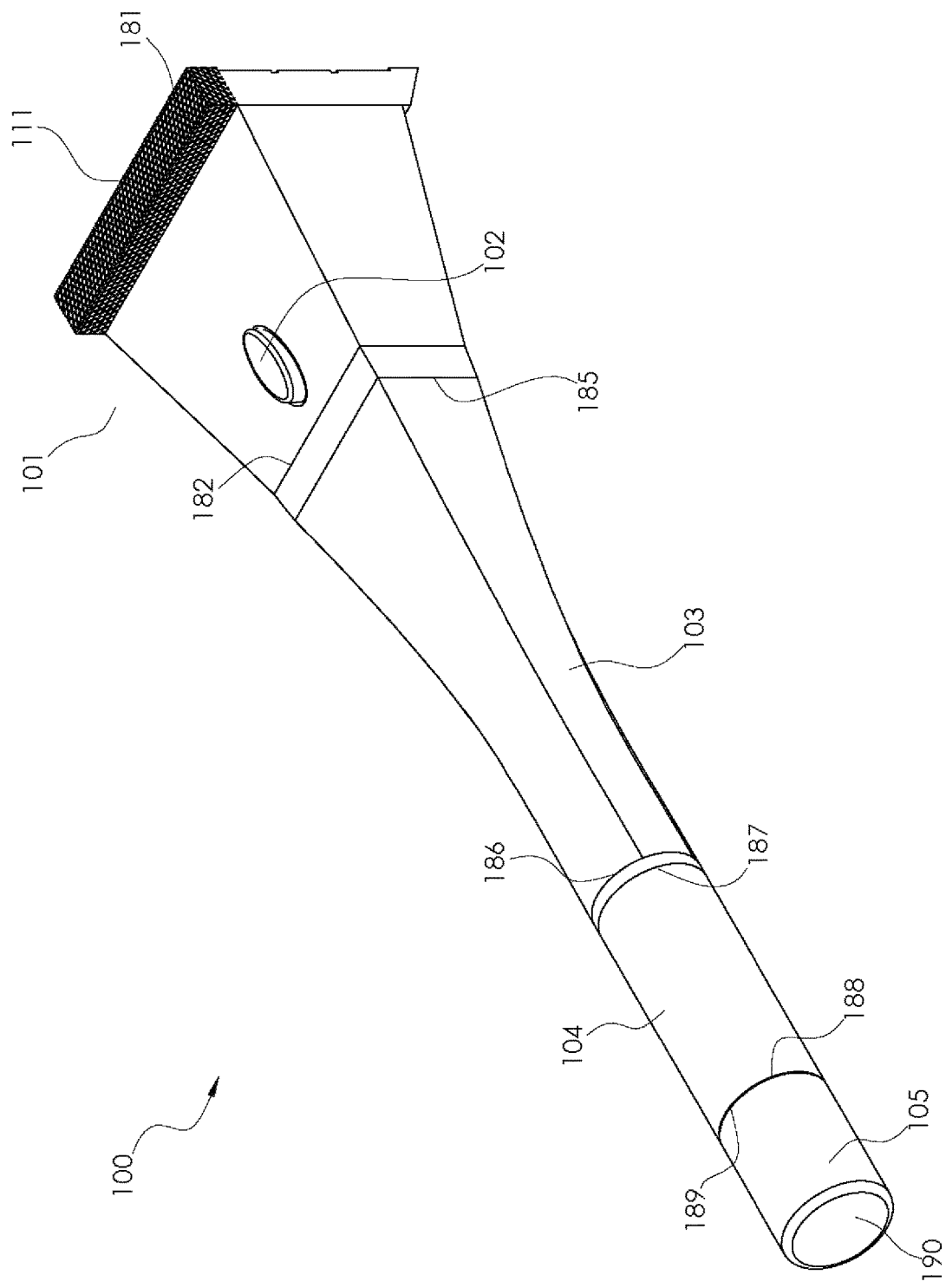
FIG. 1 is a perspective view of an embodiment of the disclosure.
Figure 3:
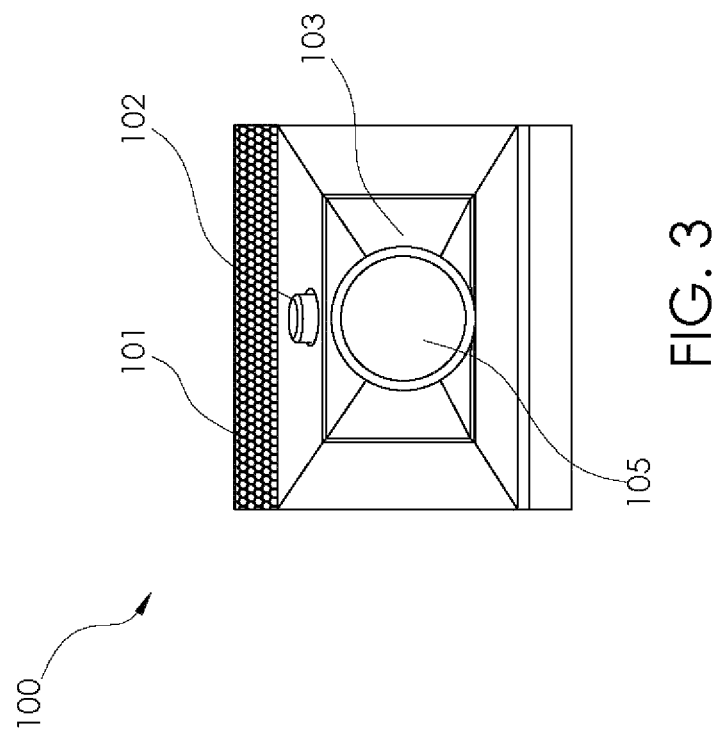
FIG. 3 is a rear-view of an embodiment of the disclosure.
Figure 2:
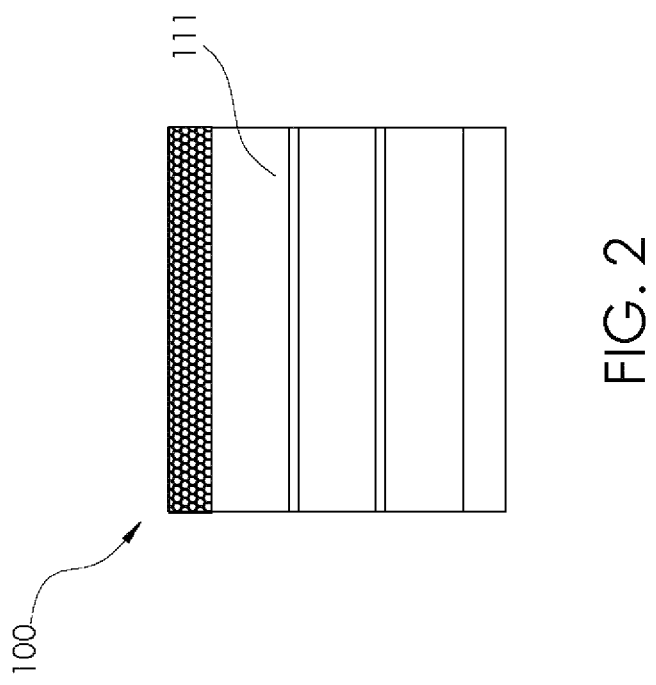
FIG. 2 is a front view of an embodiment of the disclosure.
Figure 7:
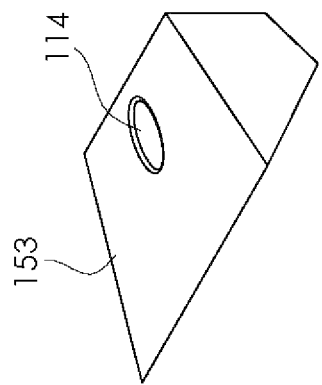
FIG. 7 is a detail view of an embodiment of the disclosure.
Figure 8:
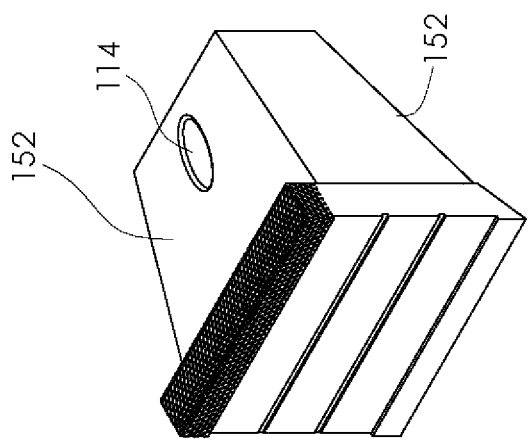
FIG. 8 is a detail view of an embodiment of the disclosure.
Figure 6:
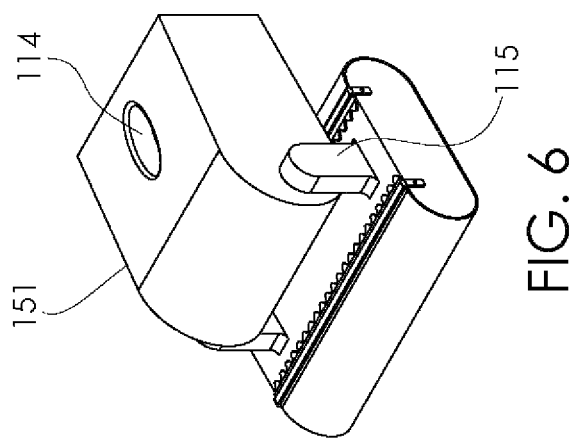
FIG. 6 is a detail view of an embodiment of the disclosure.
Figure 9:
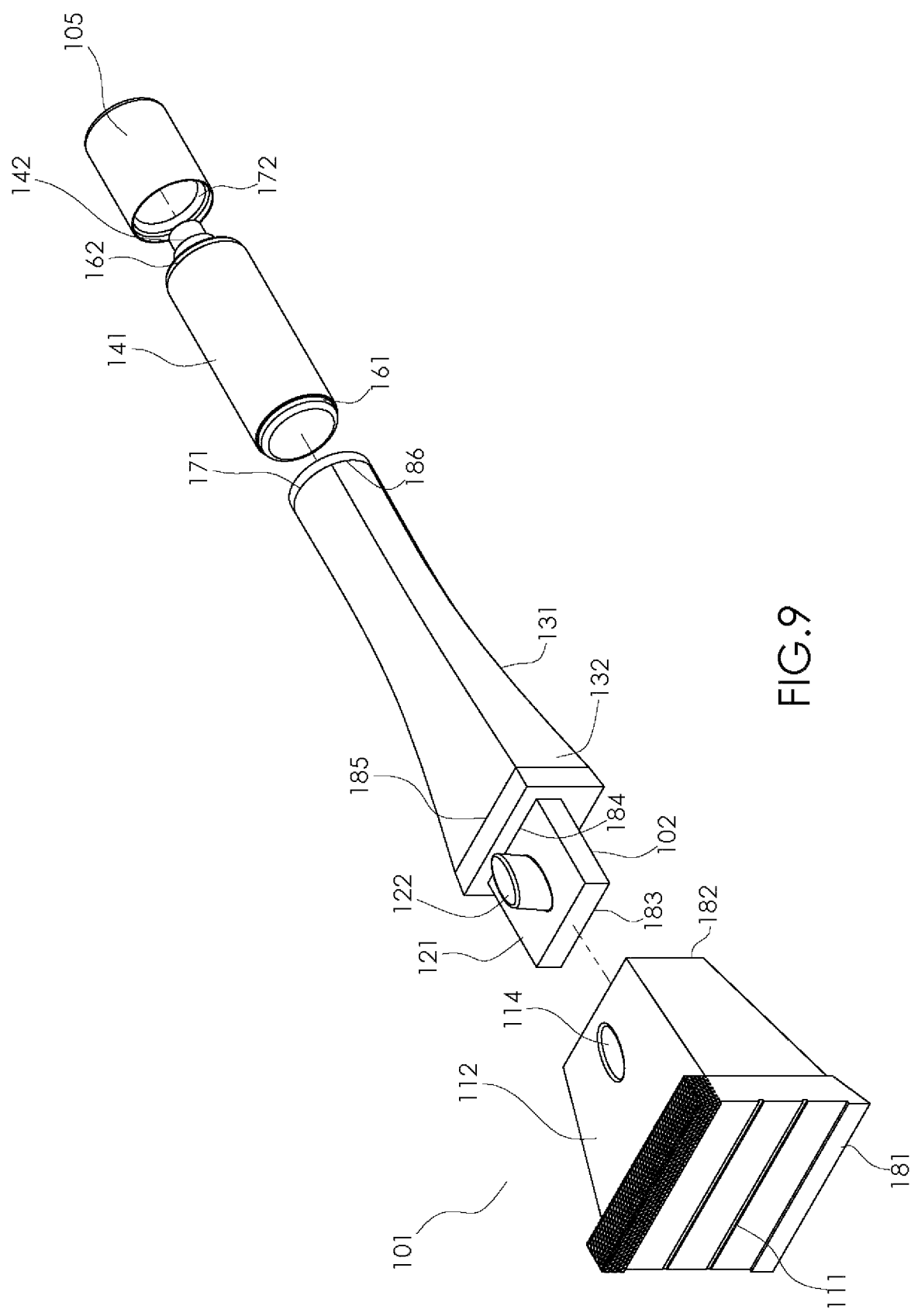
FIG. 9 is an exploded view of an embodiment of the disclosure.
Figure 10:
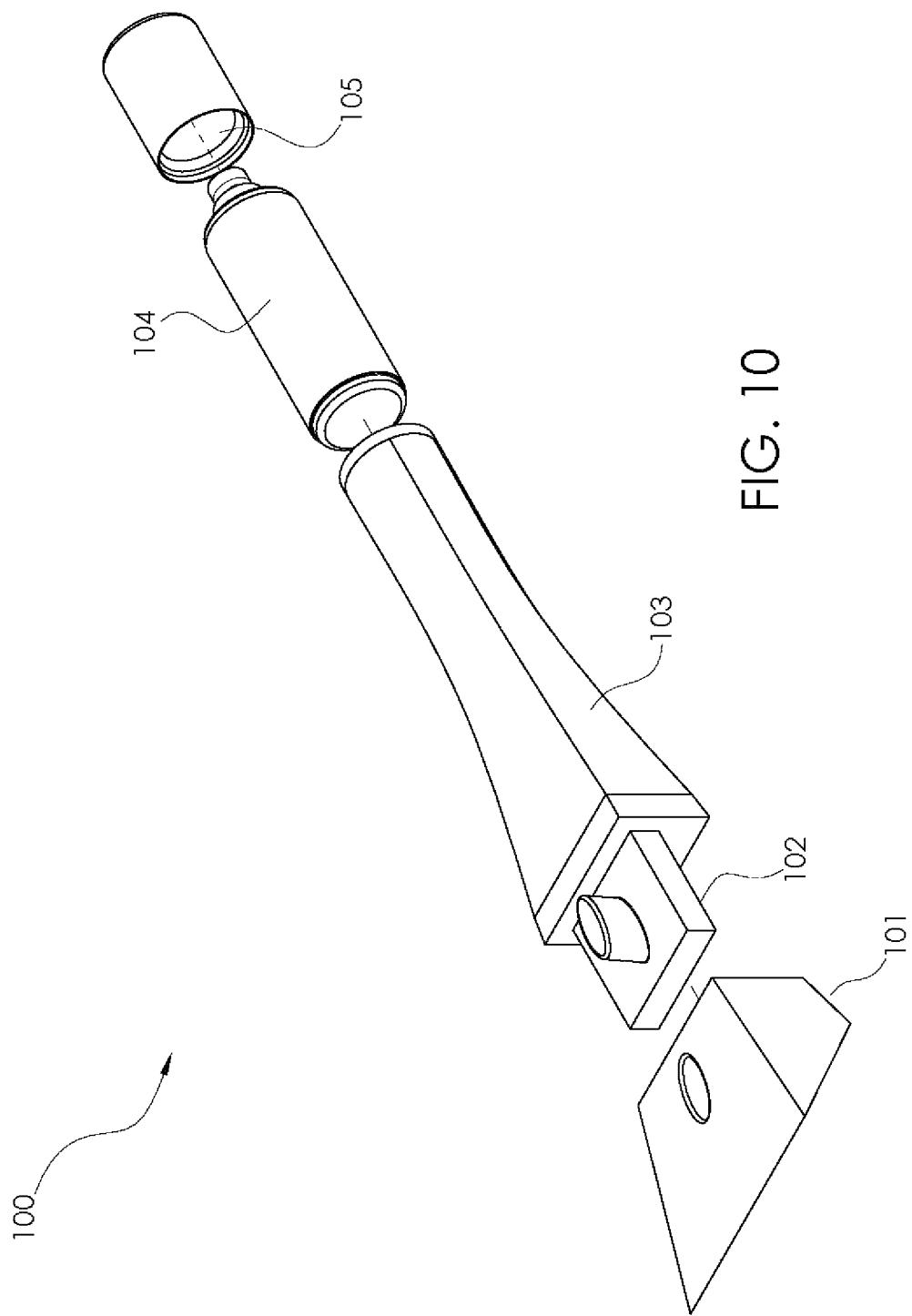
FIG. 10 is an exploded view of an embodiment of the disclosure.
Figure 11:
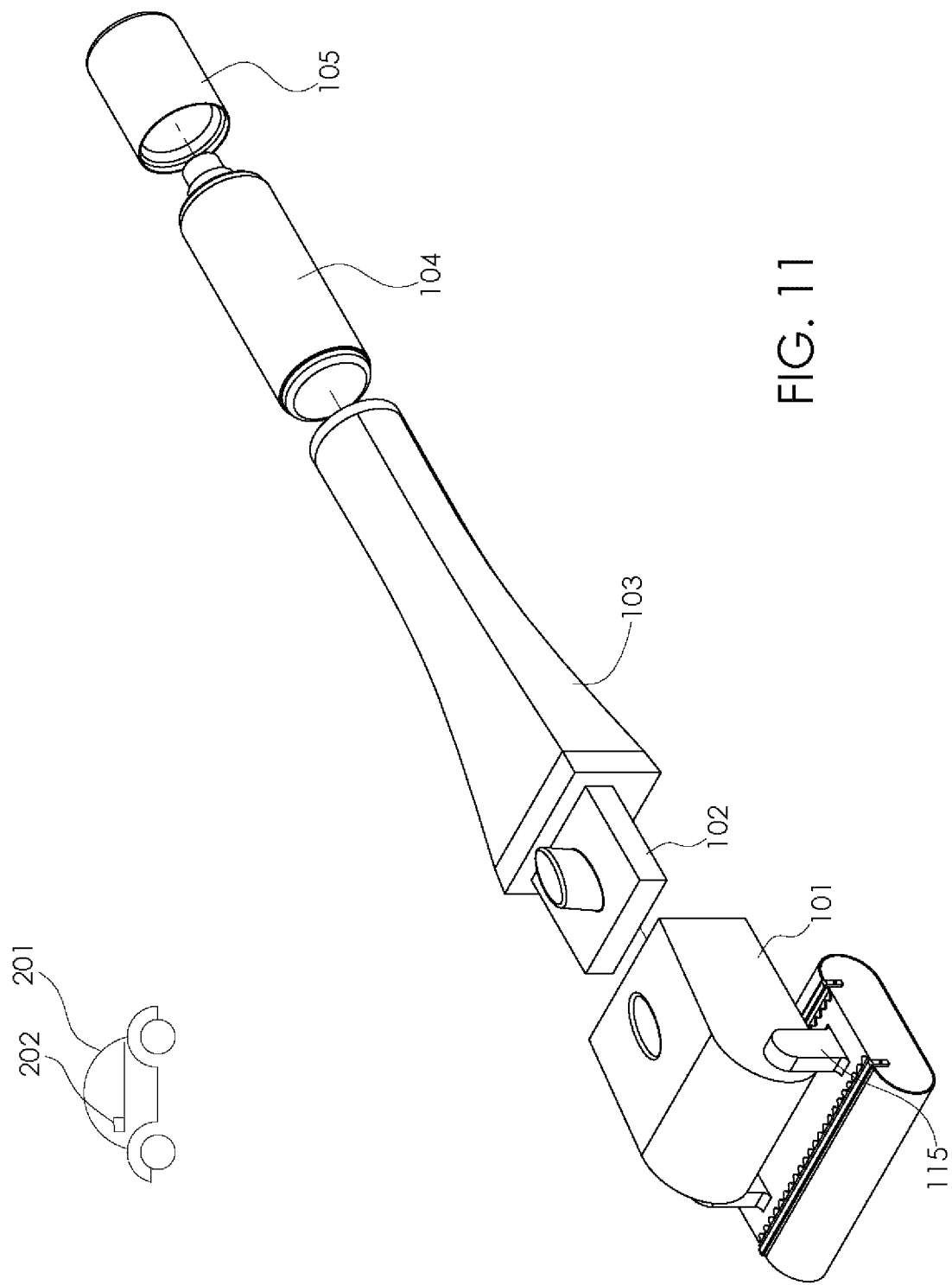
FIG. 11 is an exploded view of an embodiment of the disclosure.

Detailed reference will now be made to one or more potential embodiments of the disclosure, which are illustrated in FIGS. 1 through 11.

The side view mirror 202 cleaner 100 (hereinafter invention) is a cleaning tool. The invention 100 is configured for use with a vehicle 201. The vehicle 201 is further defined with a rear-view mirror 202 mounted on the exterior of the vehicle 201. The invention 100 cleans the rear-view mirror 202. The invention 100 comprises a cleaning head 101, a latching blade 102, a handle 103, a dispenser 104, and a cap 105. The cleaning head 101 contains the working portion of the invention 100 that cleans the rear-view mirror 202. The cleaning head 101 is interchangeable. The latching blade 102 attaches the handle 103 to the cleaning head 101. The handle 103 is an extension structure. The dispenser 104 is a device that applies a cleaning fluid to the rear-view mirror 202. The dispenser 104 attaches to the handle 103. The cap 105 is a closure that encloses the dispenser 104. The cap 105 attaches to the dispenser 104.

The cleaning head 101 is the element of the invention 100 used to clean the rear-view mirror 202 of the vehicle 201. The cleaning head 101 is an interchangeable structure that attaches to the handle 103 using the latching blade 102. The cleaning head 101 comprises a working element 111, a mounting pyramid 112, a mounting slot 113, and a latch hole 114. The cleaning head 101 is further defined with a first end 181 and a second end 182. The first end 181 is the base of the truncated pyramid structure of the working element 111. The second end 182 is the truncated apex of the truncated pyramid structure of the working element 111.

The mounting pyramid 112 is a truncated pyramid-shaped structure. The working element 111 attaches to the base of the truncated pyramid shape of the mounting pyramid 112. The working element 111 is the element of the cleaning head 101 that physically cleans the rear-view mirror 202 of the vehicle 201. The working element 111 is selected from the group consisting of a microfiber cleaning structure 151, a squeegee 152, and a scraper 153. The working element 111 mounts on the first end 181 of the mounting pyramid 112. The base of the truncated pyramid shape of the mounting pyramid 112 is formed with a bevel relative to the center axis of the truncated pyramid. This bevel allows for the adjustment of the angle of attack of the working element.

The microfiber cleaning structure 151 is a water absorbent structure configured to rub the rear-view mirror 202 of the vehicle 201 during the cleansing process. The microfiber cleaning structure 151 is a well-known and documented device that is defined in greater detail elsewhere in this disclosure. The microfiber cleaning structure 151 further comprises a hinge 115. The hinge 115 is a pivoting structure that attaches the microfiber cleaning structure 151 to the mounting pyramid 112 such that the microfiber cleaning structure 151 will rotate relative to the mounting pyramid 112.

The squeegee 152 is a bladed structure designed to remove fluids from the rear-view mirror 202 of the vehicle 201. The squeegee 152 is a well-known and documented device that is defined in greater detail elsewhere in this disclosure.

The scraper 153 is a rigid structure designed to scrape off objects that are adhered to the rear-view mirror 202 of the vehicle 201. The scraper 153 is a well-known and documented device that is defined in greater detail elsewhere in this disclosure.

The mounting slot 113 is a negative space formed in the truncated apex of the pyramid shape of the working element 111. The latching blade 102 inserts into the mounting slot 113 to attach the handle 103 to the cleaning head 101.

The latch hole 114 is an aperture formed from the exterior surface of the working element 111 to the mounting slot 113. The latch hole 114 forms a portion of a latching structure that secures the latching blade 102 to the cleaning head 101.

The latching blade 102 is a structure that mounts on the handle 103. The latching blade 102 inserts into the cleaning head 101 such that the cleaning head 101 removably attaches to the handle 103. The latching blade 102 comprises a latch block 121 and a spring post 122. The latching blade 102 is further defined with a third end 183 and a fourth end 184. The third end 183 is the free end of the latch block 121. The fourth end 184 is the fixed end of the latch block 121.

The latch block 121 is a rectangular block structure. The latch block 121 forms a plate structure. The fourth end 184 of the latch block 121 attaches to the fifth end 185 of the handle 103 in the manner of a cantilever. The third end 183 of the latch block 121 inserts into the mounting slot 113 located in the second end 182 of the cleaning head 101.

The spring post 122 is a spring loaded shaft structure that attaches to the latch block 121. The spring post 122 projects away from the latch block 121. The spring post 122 inserts through the latch hole 114 to secure the latching blade 102 to the cleaning head 101. The spring loading of the spring post 122 is configured to allow the spring post 122 removably attach the latch block 121 to the mounting slot 113 of the cleaning head 101.

Methods to make a latch described by the latch hole 114 and the spring post 122 are well-known and documented in the mechanical arts.

The handle 103 forms a grip that allows for the manipulation of the invention 100. The handle 103 is an extension structure that increases the span of the distance between the latching blade 102 and the dispenser 104. The handle 103 comprises a handle block 131, a flare 132, and a first interior screw thread 171. The handle 103 is further defined with a fifth end 185 and a sixth end 186. The fifth end 185 is the end of the handle 103 that attaches to the latch block 121. The sixth end 186 is the end of the handle 103 that is distal from the fifth end 185.

The first interior screw thread 171 is an interior screw thread of a threaded connection. The first interior screw thread 171 is formed on the sixth end 186 of the handle 103. The first exterior screw thread 161 screws into the first interior screw thread 171 to attach the bottle 141 to the handle 103.

The handle block 131 is a roughly prism-shaped structure. The prism structure of the handle block 131 is flared 132 such that the surface area of the fifth end 185 of the handle block 131 is greater than the sixth end 186 of the handle block 131. Specifically, the flare 132 is a curvature formed in the lateral face of the handle block 131 that broadens the diameter of the handle 103 at the fifth end 185 of the handle 103.

The dispenser 104 is a mechanical device. The dispenser 104 stores a cleaning fluid. The dispenser 104 dispenses the cleaning fluid on the rear-view mirror of the vehicle. The dispenser 104 screws on to the handle 103. The dispenser 104 comprises a bottle 141, a universal pump 142, a first exterior screw thread 161, and a second exterior screw thread 162. The dispenser 104 is further defined with a seventh end 187 and an eighth end 188. The seventh end 187 is the end of the dispenser 104 that is distal from the universal pump 142. The eighth end 188 is the end of the dispenser 104 that is distal from the seventh end 187. The eighth end 188 is the neck end of the bottle 141 of the dispenser 104.

The bottle 141 is a container used to store the cleaning fluid dispensed by the dispenser 104. The seventh end 187 of the bottle 141 attaches to the sixth end 186 of the handle block 131. The universal pump 142 is a spray pump that installs in the bottle 141. The universal pump 142 pumps the cleaning fluid out of the bottle 141 on to the rear-view mirror of the vehicle.

The first exterior screw thread 161 is an exterior screw thread of a threaded connection. The first exterior screw thread 161 is formed on the seventh end 187 of the bottle 141 of the dispenser 104. The second exterior screw thread 162 is an exterior screw thread of a threaded connection. The second exterior screw thread 162 is formed on the eighth end 188 of the bottle 141 of the dispenser 104.

The cap 105 is a capped tube. The cap 105 is an enclosure that encloses the dispenser 104 such that the dispenser 104 will not dispense the working fluid unintentionally. The cap 105 screws on to the dispenser 104. The cap 105 further comprises a second interior screw thread 172. The cap 105 is further defined with a ninth end 189 and a tenth end 190. The second interior screw thread 172 is an interior screw thread of a threaded connection. The second interior screw thread 172 is formed on the ninth end 189 of the cap 105. The second exterior screw thread 162 screws into the second interior screw thread 172 to attach the cap 105 to the bottle 141 of the dispenser 104. The ninth end 189 is the open end of the cap 105. The tenth end 190 is the closed end of the cap 105.

The following definitions were used in this disclosure:

Blade: As used in this disclosure, a blade is a term that is used to describe a wide and flat structure or portion of a structure larger structure such as a propeller.

Bottle: As used in this disclosure, a bottle is a container used for the storage of fluids. Access to the interior of a bottle is gained through the neck of the bottle. The neck is an elongated tube that forms an aperture through which fluids can be introduced and removed from the bottle.

Cantilever: As used in this disclosure, a cantilever is a beam or other structure that projects away from an object and is supported on only one end. A cantilever is further defined with a fixed end and a free end. The fixed end is the end of the cantilever that is attached to the object. The free end is the end of the cantilever that is distal from the fixed end.

Capped Tube: As used in this disclosure, a capped tube is a tube with one closed end and one open end.

Extension Structure: As used in this disclosure, an extension structure is an inert physical structure that is used to extend the span of the distance between any two objects.

Exterior Screw Thread: An exterior screw thread is a ridge wrapped around the outer surface of a tube in the form of a helical structure that is used to convert rotational movement into linear movement.

Flare: As used in this disclosure, a flare is a curvature that is formed in a structure. Specifically, a flare refers to a gradual curvature in a direction away from a plane or axis defined by the structure. This definition is intended to include rectilinear structures that form an angle to an axis of symmetry.

Fluid: As used in this disclosure, a fluid refers to a state of matter wherein the matter is capable of flow and takes the shape of a container it is placed within. The term fluid commonly refers to a liquid or a gas.

Hinge: As used in this disclosure, a hinge is a device that permits the turning, rotating, or pivoting of a first object relative to a second object.

Interior Screw Thread: An interior screw thread is a groove that is formed around the inner surface of a tube in the form of a helical structure that is used to convert rotational movement into linear movement.

Latch: As used in this disclosure, a latch is a fastening or locking mechanism. The use of the term latch does not necessarily but often implies the insertion of an object into a notch or cavity.

Liquid: As used in this disclosure, a liquid refers to a state (phase) of matter that is fluid and that maintains, for a given pressure, a fixed volume that is independent of the volume of the container.

Microfiber Yarn: As used in this disclosure, a yarn is said to be a microfiber yarn when the average number of filaments or fibers contained in a cross-section of the yarn is greater than the denier of the yarn. Stated differently, a microfiber yarn is a yarn made from fibers or filaments with an average fineness, as measured by denier, of less than one denier. Please note: This definition is similar to but differs from the definition of microfiber yarn that is generally accepted in the textile industry. This definition is preferred in this disclosure because of the relative simplicity of the definition and because the difference between the two definitions has little commercial or practical relevance.

Microfiber Textile: As used in this disclosure, a microfiber textile is a textile that is formed from microfiber yarns.

Negative Space: As used in this disclosure, negative space is a method of defining an object through the use of open or empty space as the definition of the object itself, or, through the use of open or empty space to describe the boundaries of an object.

N-gon: As used in this disclosure, an N-gon is a regular polygon with N sides wherein N is a positive integer number greater than 2.

Pivot: As used in this disclosure, a pivot is a rod or shaft around which an object rotates or swings.

Plate: As used in this disclosure, a plate is a smooth, flat and semi-rigid or rigid structure that has at least one dimension that: a) is of uniform thickness; and b) that appears thin relative to the other dimensions of the object. Plates often have a rectangular or disk like appearance. The face of the plate is a surface of the plate selected from the group consisting of: a) the surface of the plate with the greatest surface area; b) the surface of the plate that is distal from the surface of the plate with the greatest surface area. The edges of the plate comprise the surfaces of the plate that would not be considered faces as defined above. As defined in this disclosure, plates may be made of any material, but are commonly made of metal, plastic, and wood. When made of wood, a plate is often referred to as a board.

Post: As used in this disclosure, a post is a shaft that is: 1) set into a surface; and 2) provides a supporting structure that is perpendicular to the surface.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Pump: As used in this disclosure, a pump is a mechanical device that uses suction or pressure to raise or move fluids, compress fluids, or force a fluid into an inflatable object. Within this disclosure, a compressor refers to a pump dedicated to compressing a fluid or placing a fluid under pressure.

Pyramid: As used in this disclosure, a pyramid is a three-dimensional shape that comprises a base formed in the shape of an N-gon (wherein N is an integer) with N triangular faces that rise from the base to converge at a point above the base. If the point where the N faces meet is positioned such that a line drawn from the point where the N faces meet to the center of the N-gon base is perpendicular to the N-gon base, the pyramid is referred to as a right pyramid. Pyramids can be further formed with circular or elliptical bases which are commonly referred to as cone or an elliptical pyramid respectively. A pyramid is defined with a base, an apex, and a lateral face. The base is the N-gon shaped base described above. The apex is the convergence point described above. The lateral face is formed from the N triangular faces described above.

Rectangular Block: As used in this disclosure, a rectangular block refers to a three-dimensional structure comprising six rectangular surfaces (commonly called faces) formed at right angles. Within this disclosure, a rectangular block may further comprise rounded edges and corners.

Screw: As used in this disclosure, to screw is a verb meaning: 1) to fasten or unfasten (unscrew) a threaded connection; or 2) to attach a helical structure to a solid structure.

Spray: As used in this disclosure, a spray is a plurality of liquid drops dispersed in a gas.

Spray Nozzle: As used in this disclosure, a spray nozzle is a device that receives liquid under pressure and disperses that liquid into the atmosphere as a spray.

Spring: As used in this disclosure, a spring is a device that is used to store mechanical energy. This mechanical energy will often be stored by: 1) deforming an elastomeric material that is used to make the device; 2) the application of a torque to a semi-rigid structure; or 3) a combination of the previous two items.

Squeegee: As used in this disclosure, a squeegee is a tool formed with a rubber-edged crosspiece used for removing water from a window.

Textile: As used in this disclosure, a textile is a material that is woven, knitted, braided or felted. Synonyms in common usage for this definition include fabric and cloth.

Threaded Connection: As used in this disclosure, a threaded connection is a type of fastener that is used to join a first tube-shaped and a second tube-shaped object together. The first tube-shaped object is fitted with a first fitting selected from an interior screw thread or an exterior screw thread. The second tube-shaped object is fitted with the remaining screw thread. The tube-shaped object fitted with the exterior screw thread is placed into the remaining tube-shaped object such that: 1) the interior screw thread and the exterior screw thread interconnect; and, 2) when the tube-shaped object fitted with the exterior screw thread is rotated the rotational motion is converted into linear motion that moves the tube-shaped object fitted with the exterior screw thread either into or out of the remaining tube-shaped object. The direction of linear motion is determined by the direction of rotation.

Tool: As used in this disclosure, a tool is a device, an apparatus, or an instrument that is used to carry out an activity, operation, or procedure.

Truncated: As used in this disclosure, a geometric object is truncated when an apex, vertex, or end is cut off by a line or plane.

Truncated Pyramid: As used in this disclosure, a truncated pyramid is a frustum that remains when the apex of a pyramid is truncated by a plane that is parallel to the base of the pyramid.

Tube: As used in this disclosure, the term tube is used to describe a rigid hollow prism with two open ends. While tubes that are suitable for use in this disclosure are often used to transport or conveys fluids or gases, the purpose of the tubes in this disclosure are structural. In this disclosure, the terms inner dimension and the outer dimension of a tube are used as they would be used by those skilled in the plumbing arts.

Universal Dispenser Pump: As used in this disclosure, a universal dispenser pump is a pump that is used to pump a liquid out of a bottle. The universal dispenser pump is a well-known and documented commercially available product that is often referred to as a soap pump or a shampoo pump.

Working Element: As used in this disclosure, the working element of a tool is the physical element on the tool that performs the actual activity, operation, or procedure the tool is designed to perform. For example, the cutting edge of a blade is the working element of a knife.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A side mirror cleaner comprising:
a cleaning head, a latching blade, a handle, a dispenser, and a cap;
wherein the cleaning head is interchangeable;
wherein the latching blade attaches the handle to the cleaning head;
wherein the dispenser attaches to the handle;
wherein the cap attaches to the dispenser;
wherein the side-view mirror cleaner is a cleaning tool;
wherein the side mirror cleaner is configured to clean a rear-view mirror on an exterior of a vehicle;
wherein the cleaning head is the working surface of the side mirror cleaner;
wherein the handle is an extension structure;
wherein the dispenser is a device that applies a cleaning fluid to the rear-view mirror;
wherein the cap is a structure that encloses the dispenser;
wherein the cleaning head comprises a working element, a mounting pyramid, a mounting slot, and a latch hole;
wherein the cleaning head is further defined with a first end and a second end;
wherein the working element attaches to the mounting pyramid;
wherein the mounting slot and the latch hole are formed in the mounting pyramid;
wherein the mounting pyramid is a truncated pyramid-shaped structure;
wherein the first end is the base of the truncated pyramid structure of the working element;
wherein the second end is the truncated apex of the truncated pyramid structure of the working element.

2. The side mirror cleaner according to claim 1
wherein the working element attaches to the base of the truncated pyramid shape of the mounting pyramid;
wherein the working element physically cleans the rear-view mirror of the vehicle.

3. The side mirror cleaner according to claim 2
wherein the working element is selected from the group consisting of a microfiber cleaning structure, a squeegee, and a scraper;

wherein the microfiber cleaning structure is a water absorbent structure configured to rub the rear-view mirror of the vehicle during the cleansing process;
wherein the squeegee is a bladed structure designed to remove fluids from the rear-view mirror of the vehicle;
wherein the scraper is a rigid structure designed to scrape off objects that are adhered to the rear-view mirror of the vehicle.

4. The side mirror cleaner according to claim 3
wherein the mounting slot is a negative space;
wherein the mounting slot is formed in the truncated apex of the pyramid shape of the working element.

5. The side mirror cleaner according to claim 4
wherein the latch hole is an aperture;
wherein the latch hole is formed from the exterior surface of the working element to the mounting slot.

6. The side mirror cleaner according to claim 5
wherein the latching blade is a structure that mounts on the handle;
wherein the latching blade mounts to the handle in the manner of a cantilever;
wherein the latching blade inserts into the mounting slot;
wherein the latching blade inserts into the mounting slot such that the cleaning head removably attaches to the handle.

7. The side mirror cleaner according to claim 6
wherein the latching blade comprises a latch block and a spring post;
wherein the latching blade is further defined with a third end and a fourth end;
wherein the spring post attaches to the latch block;
wherein the third end is the free end of the latch block;
wherein the fourth end is the fixed end of the latch block.

8. The side mirror cleaner according to claim 7
wherein the latch block is a rectangular block structure;
wherein the latch block forms a plate structure;
wherein the third end of the latch block inserts into the mounting slot located in the second end of the cleaning head.

9. The side mirror cleaner according to claim 8
wherein the spring post is a spring loaded shaft structure that attaches to the latch block;
wherein the spring post projects away from the latch block;
wherein the spring post inserts through the latch hole to secure the latching blade to the cleaning head;
wherein the spring loading of the spring post is configured to allow the spring post removably attach the latch block to the mounting slot of the cleaning head.

10. The side mirror cleaner according to claim 9
wherein the handle is an extension structure;
wherein the handle increases the span of the distance between the latching blade and the dispenser.

11. The side mirror cleaner according to claim 10
wherein the handle comprises a handle block, a flare, and a first interior screw thread;
wherein the handle is further defined with a fifth end and a sixth end;
wherein the fourth end of the latch block attaches to the fifth end of the handle in the manner of a cantilever;
wherein the handle is formed with the flare;
wherein the handle is formed with the exterior screw thread;
wherein the first interior screw thread is an interior screw thread of a threaded connection;
wherein the first interior screw thread is formed on the third end of the handle;
wherein the fifth end is the end of the handle that attaches to the latch block;
wherein the sixth end is the end of the handle that is distal from the fifth end.

12. The side mirror cleaner according to claim 11
wherein the handle block is a roughly prism-shaped structure;
wherein the flare is a curvature formed in the lateral face of the handle block that broadens the diameter of the handle at the fifth end of the handle.

13. The side mirror cleaner according to claim 12
wherein the dispenser is a mechanical device;
wherein the dispenser stores a cleaning fluid;
wherein the dispenser dispenses the cleaning fluid on the rear-view mirror of the vehicle.

14. The side mirror cleaner according to claim 13
wherein the dispenser comprises a bottle, a universal pump, a first exterior screw thread, and a second exterior screw thread;
wherein the dispenser is further defined with a seventh end and an eighth end;
wherein the seventh end is the end of the dispenser that is distal from the universal pump;
wherein the eighth end is the end of the dispenser that is distal from the seventh end;
wherein the eighth end is the neck end of the bottle of the dispenser;
wherein the bottle is a container that stores the cleaning fluid;
wherein the seventh end of the bottle attaches to the sixth end of the handle block;
wherein the universal pump installs in the bottle;
wherein the first exterior screw thread is an exterior screw thread of a threaded connection;
wherein the first exterior screw thread is formed on the seventh end of the bottle of the dispenser;
wherein the first exterior screw thread screws into the first interior screw thread to attach the bottle to the handle;
wherein the second exterior screw thread is an exterior screw thread of a threaded connection;
wherein the second exterior screw thread is formed on the eighth end of the bottle of the dispenser.

15. The side mirror cleaner according to claim 14
wherein the universal pump is a spray pump;
wherein the universal pump pumps the cleaning fluid out of the bottle on to the rear-view mirror of the vehicle.

16. The side mirror cleaner according to claim 15
wherein the cap is a capped tube;
wherein the cap is an enclosure that encloses the dispenser;
wherein the cap is further defined with a ninth end and a tenth end;
wherein the ninth end is the open end of the cap;
wherein the tenth end is the closed end of the cap;
wherein the cap further comprises a second interior screw thread;
wherein the second interior screw thread is an interior screw thread of a threaded connection;
wherein the second interior screw thread is formed on the ninth end of the cap.

17. The side mirror cleaner according to claim 16 wherein the second exterior screw thread screws into the second interior screw thread to attach the cap to the bottle of the dispenser.

18. The side mirror cleaner according to claim 17
wherein the microfiber cleaning structure further comprises a hinge;

wherein the hinge is a pivoting structure that attaches the microfiber cleaning structure to the mounting pyramid such that the microfiber cleaning structure will rotate relative to the mounting pyramid.

* * * * *